Patented Oct. 2, 1928.

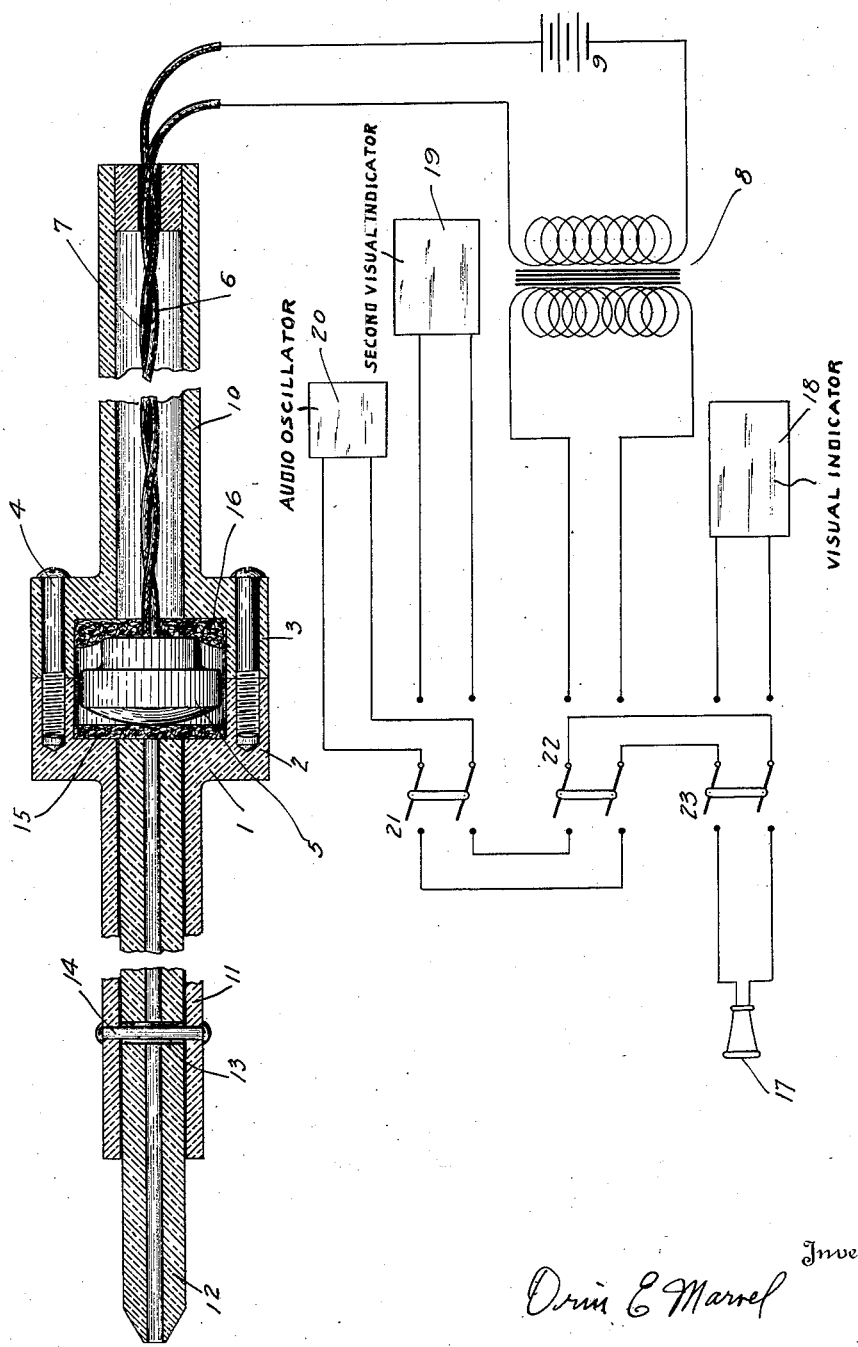

1,686,138

UNITED STATES PATENT OFFICE.

ORIN E. MARVEL, OF DAYTON, OHIO.

VIBROMETER.

Application filed October 19, 1922. Serial No. 595,704.

This invention relates to devices for detecting and studying vibrations and oscillations of any kind and for rendering small sounds in a living body distinctly audible on a magnified scale.

It is an object of my invention to provide a vibroscope of a sensitive nature making use of mechanical and electrical means for magnifying small sounds.

I have found that the addition of a soft rubber or other similar shock absorbing armature between a transmitter button and an element adapted to transmit vibrations from a vibrating article to the transmitter button greatly aids in the reception of signals indicating the measured vibrations. This incontacting element is movably supported in the housing so that a small definite movement is permitted, the transmitter button being supported in the housing by a shock absorbing material so as to be cushioned therein.

Further objects will be more particularly set forth in the accompanying description and claims.

In the drawing: the figure shows the electrical connections to the various parts, the housing for the transmitter being shown in section.

I provide a housing of any suitable material such as hard rubber or phenolic condensation product designated generally by 1 and preferably constructed of two parts 2 and 3 assembled by means of screws 4. Within the housing is a sensitive telephone transmitter, preferably a microphone button 5, from which extend wires 6, 7, to an induction coil 8 and battery 9. These wires extend through the rear part 10 of the housing. Within the front part 11 of the housing is fitted a rod 12 of bakelite or metal, provided with a slot 13 extending transversely of the rod. A pin 14 extending through the slot secures the rear end of the rod within the housing while permitting slight longitudinal movement of the rod. Between the rear end of rod 12 and the microphone button is a comparatively soft springy washer or disk 15 of sponge rubber or similar material, and an additional washer 16 of sponge rubber is provided in back of the microphone button to hold the microphone button in place.

The secondary of the induction coil 8 is adapted to be connected to a listening device such as a telephone receiver or an audio amplifier 17 by means of suitable switches. Numeral 18 represents a visual indicator such as an oscillograph and 19 is a second visual indicator. 20 is a device such as an audio oscillator for producing vibrations of known frequency for use in comparison with the vibrations of the part to be tested. Double throw double pole switches are connected to the listening device, visual indicators, audio oscillator, and induction coil so that the induction coil may be connected to one visual indicator while the audio oscillator is connected to the second visual indicator. The two records obtained may be compared for determining the frequency and amplitude of the vibration investigated. The switches may also connect the listening device to the induction coil and to the audio oscillator alternately so as to compare the vibrations to vibrations of known characteristics.

Having determined the frequency and amplitude of vibrations of a mechanical vibration, such as a crank shaft or gas motor, the mass of unbalance may be calculated from a determination of the critical vibration of the part.

It will be understood that the rod 12 is placed against the vibrating mechanism to be tested. The rod is thus caused to vibrate at the same frequency and with the same amplitude as the vibrating mechanism. An electric current is constantly flowing through the induction coil and microphone transmitter. The amount of current that flows in this circuit depends upon the resistance of the microphone button which is filled with fine carbon granules. Any vibrations imparted to the diaphragm of the microphone button by the rod 12 causes the resistance of the button to change, thus causing a change in the current flow in the induction coil circuit. This change induces a current in the secondary of the induction coil which is recorded or observed. The sponge rubber between the rod 12 and the diaphragm of the microphone button will successfully damp out and render inaudible all small and minor vibrations and rumblings and allow the main vibrations only to be observed without interference. In determining the location of the different knocks in a gas motor it has been found that the knock is louder and more distinct when the end of the rod 12 is applied nearest to the knock. A tapping valve may be definitely located by observing the volume and frequency of the sound in the receiver while the rod 12 is applied to different spots on the cylinder block.

Having thus fully set forth my invention, what I claim as new and desire to secure by Letter Patent, is:

1. In combination, a sound transmitting member comprising a housing, a microphone transmitter therein, a soft disc like pad between one side of the transmitter and the housing, an element movably supported by said housing and adapted to contact with an external vibrating body to transmit the vibrations to said transmitter, means limiting the movement of said element relative to the housing, and a soft pad of material between said element and said microphone transmitter.

2. In combination, a sound transmitting member comprising a housing formed in two sections detachably connected together, one section being provided with a handle provision, and an element movably supported by said other section and adapted to contact with external vibrating body to transmit the vibrations to a microphone transmitter, a microphone transmitter supported in said housing adjacent to the joint of said sections, a soft disc like pad between the transmitter and said one section and a soft pad of material between said transmitter and the other of said sections, said soft pad of material being also placed between said transmitter and the end of said element.

3. In combination, a sound transmitting member comprising a housing, a microphone transmitter therein, soft rubber cushioning means mounting said transmitter within said housing, an element movably supported by said housing and adapted to contact with an external vibrating body to transmit the vibrations to said transmitter, and means limiting the movement of said element relative to said housing.

In testimony whereof I affix my signature.

ORIN E. MARVEL.